(12) United States Patent
Edelson et al.

(10) Patent No.: US 8,924,040 B2
(45) Date of Patent: Dec. 30, 2014

(54) APPARATUS FOR CONTROLLING AIRCRAFT GROUND MOVEMENT

(76) Inventors: Jonathan Sidney Edelson, Portland, OR (US); Isaiah Watas Cox, Baltimore, MD (US)

( * ) Notice: Subject to any disclaimer, the term of this patent is extended or adjusted under 35 U.S.C. 154(b) by 1320 days.

(21) Appl. No.: 12/310,610

(22) PCT Filed: Aug. 29, 2007

(86) PCT No.: PCT/US2007/019054
§ 371 (c)(1),
(2), (4) Date: Feb. 27, 2009

(87) PCT Pub. No.: WO2008/048393
PCT Pub. Date: Apr. 24, 2008

(65) Prior Publication Data
US 2010/0217456 A1    Aug. 26, 2010

Related U.S. Application Data

(60) Provisional application No. 60/958,602, filed on Jul. 5, 2007.

(30) Foreign Application Priority Data

Aug. 29, 2006 (GB) .................................. 0616984.1

(51) Int. Cl.
*B64C 25/00* (2006.01)
*B64C 25/50* (2006.01)
*B64F 1/22* (2006.01)
*B64C 25/40* (2006.01)

(52) U.S. Cl.
CPC .................. *B64F 1/22* (2013.01); *B64C 25/405* (2013.01); *Y02T 50/823* (2013.01); *Y10S 180/904* (2013.01)
USPC ................ 701/2; 180/904; 244/189; 244/1 R; 244/100 R; 244/229; 244/234; 244/50

(58) Field of Classification Search
USPC ...... 180/904; 244/189, 1 R, 100 R, 229, 234, 244/50
See application file for complete search history.

(56) References Cited

U.S. PATENT DOCUMENTS

| 3,937,290 A * | 2/1976 | Benning ....................... 180/14.7 |
| 6,305,484 B1 * | 10/2001 | Leblanc ........................ 180/167 |
| 6,371,829 B1 * | 4/2002 | Kato et al. .................... 446/456 |
| 2006/0065779 A1 * | 3/2006 | McCoskey et al. ........ 244/100 R |
| 2006/0158050 A1 * | 7/2006 | Maeda et al. ................... 310/58 |

\* cited by examiner

*Primary Examiner* — Adam Tissot

(57) ABSTRACT

A method and apparatus is disclosed for reversing an aircraft on the ground comprising driving the aircraft using at least one self-propelled undercarriage wheel. An apparatus for controlling at least one of speed and at least one direction of an aircraft having a self-propelled nosewheel, on the ground, is disclosed. The apparatus comprises a control arm; a control unit; means for transmitting information to said self-propelled nosewheel; means for receiving information at said self-propelled nosewheel; and means for controlling at least one of the speed and direction of said nosewheel; whereby airport ground staff can intuitively control the movements of said aircraft by holding said arm and moving it in the direction of required movement of said aircraft.

18 Claims, 3 Drawing Sheets

APPARATUS FOR CONTROLLING AIRCRAFT GROUND MOVEMENT

CROSS-REFERENCE TO RELATED APPLICATIONS

This application is the U.S. national stage application of International Application No. PCT/US2007/019054, filed 29 Aug. 2007, which international application was published on 24 Apr. 2008, as International Publication WO 2008/048393-A2 in the English language. The International Application claims the benefit of GB Provisional Patent Application No. 0616984.1, filed 29 Aug. 2006, and U.S. Provisional Patent Application No. 60/958,602, filed Jul. 5, 2007. The above-mentioned patent applications are herein incorporated in their entirety by reference.

TECHNICAL FIELD

The invention relates to aircraft ground movement and in particular to controlling the movement of an aircraft propelled by a self-propelled nosewheel, on the ground. The invention also relates to a method for reversing aircraft on the ground, and specifically to the use of self-propelled undercarriage to reverse aircraft on the ground.

BACKGROUND ART

There is a frequent need to reverse aircraft on the ground, for example, from a parking space into which the aircraft drives forwards, or to maneuver the aircraft in a hangar or maintenance area. Common methods of reversing aircraft include pushback and powerback.

Pushback is carried out by attaching a tug to the nosewheel of an aircraft. The tug is a low-profile, self-powered vehicle which is usually manned by a driver. Conventionally, a towbar is used to attach the tug to the aircraft nose wheel to enable the tug to maneuver the aircraft. The use of tow-bar-less tugs is also known in the art, for example the TBL600 tug made by Douglas Equipment (UK), in which the nose wheel of the aircraft is picked up by the tug, enabling the tug to maneuver the aircraft. It is also known in the air to have unmanned tugs, for example those used by Air France. Tugs are commonly in short supply at airports and delays are often caused while aircraft wait for tugs. Additionally, the tug takes time to attach to the aircraft.

Powerback is the use of the turbine engines to reverse an aircraft. The turbine output is diverted so that the exhaust gases are blown forwards rather than backwards. This is known as reverse thrust, and is used to slow down the aircraft on landing. The use of reverse thrust to move the aircraft backwards is less common since it provides limited maneuverability, is noisy, and uses a large amount of fuel. Specifically, the powerback causes the jet exhaust to blow debris up from the ground, which often is then sucked into the intake. The fact that airlines have tried such a method in spite of the problems described is an indication of the value of being able to reverse aircraft from gates without the use of tugs.

A method for enabling an aircraft to enter and leave a parking space in which there is insufficient space to turn around is disclosed in the art.

DE1012260 to Kuesel discloses a rotating platform, having a linear conveyor belt within said platform, said conveyor belt having forward and reverse modes. The platform is located in an aircraft parking space and enables an aircraft driven onto it to be moved into position for unloading and loading of passengers, and then turned around before being driven off the platform.

This is expensive to install at airports and may not be large enough for all aircraft that may require it in the future.

Self-propelled undercarriage assemblies are known in the art. U.S. Pat. No. 3,711,043 to Cameron-Johnson discloses an aircraft drive wheel having a fluid-pressure-operated motor housed within the wheel and two planetary gear stages housed in a gear box outboard of the motor, the final drive being transmitted from a ring gear of the second gear stage, which is inboard of the first stage, to the wheel through an output drive quill coupled, through a disc-type clutch if desired, to a flanged final drive member surrounding the inner end of the gear box and bolted to the wheel.

U.S. Pat. No. 3,977,631 to Jenny discloses a wheel drive motor selectively coupled to an aircraft wheel through a rotatably mounted aircraft brake assembly in order to drive the wheels of an aircraft. The normally non-rotating stator portion of a conventional aircraft brake assembly is rotatably mounted about the wheel axle and is rotatably driven through a planetary gear system by the wheel drive motor.

A solution disclosed in WO2005/035358 discloses a mesh connected high phase order induction motor, situated in close proximity to, and preferably within, the nosegear. The mesh connection enables variable inductance so that the machine has a range of speed/torque profiles available.

European Patent No. 0 756 556 B1 to Giovanardi and Centofante discloses an aircraft having wheel driving means associated with at least one of the wheels of the landing gear. A motor powered by the auxiliary power unit of the aircraft is used to drive the wheels of the landing gear. The assembly comprises an electric or hydraulic motor in operative connection with a differential gear assembly, each wheel being mounted on an axle in forward operative connection with a respective half-shaft of the differential gear through a free wheel mechanism.

All of the solutions mentioned above require extra space to be occupied close to the undercarriage wheel, requiring extra space in the bay into which the undercarriage retracts. Space in this area is severely restricted. The shape and volume of the bay into which the undercarriage wheel retracts is of fixed size and cannot easily be altered. Further, using a bigger wheel and a bigger tire, in order to house a motor powerful enough to move the plane unassisted, will increase the mass of that part of the undercarriage, which may have deleterious effects on the balance and handling of the aircraft. Thus, installation of any of these motors requires serious modification of aircraft and as such they have not been widely used. Therefore, improved airport procedures and methods associated with such equipment have not been developed.

Motors providing high torque at low speeds are known in the art. Specifically, such motors are known that are designed for the purpose of propelling aircraft on the ground.

In WO05112584, Edelson discloses a motor-generator machine comprising a slotless AC induction motor. The motor disclosed therein is an AC induction machine comprising an external electrical member attached to a supporting frame and an internal electrical member attached to a supporting core; one or both supports are slotless, and the electrical member attached thereto comprises a number of surface mounted conductor bars separated from one another by suitable insulation. An airgap features between the magnetic portions of core and frame. Electrical members perform the usual functions of rotor and stator but are not limited in position by the present invention to either role. The stator comprises at least three different electrical phases supplied with electrical power by an inverter. The rotor has a standard winding configuration, and the rotor support permits axial rotation.

In WO2006/002207, Edelson discloses a motor-generator machine comprising a high phase order AC machine with short pitch winding. Disclosed therein is a high phase order alternating current rotating machine having an inverter drive that provides more than three phases of drive waveform of harmonic order H, and characterized in that the windings of the machine have a pitch of less than 180 rotational degrees. Preferably the windings are connected together in a mesh, star or delta connection. The disclosure is further directed to selection of a winding pitch that yields a different chording factor for different harmonics. The aim is to select a chording factor that is optimal for the desired harmonics.

In WO2006/065988, Edelson discloses a motor-generator machine comprising stator coils wound around the inside and outside of a stator, that is, toroidally wound. The machine may be used with a dual rotor combination, so that both the inside and outside of the stator may be active. Even order drive harmonics may be used, if the pitch factor for the windings permits them. In a preferred embodiment, each of the coils is driven by a unique, dedicated drive phase. However, if a number of coils have the same phase angle as one another, and are positioned on the stator in different poles, these may alternatively be connected together to be driven by the same drive phase. In a preferred embodiment, the coils are connected to be able to operate with 2 poles, or four poles, under H=1 where H is the harmonic order of the drive waveform. The coils may be connected together in series, parallel, or anti-parallel.

In U.S. Patent Appl. Pub. No. 2006/0273686, a motor-generator machine is disclosed comprising a polyphase electric motor which is preferably connected to drive systems via mesh connections to provide variable V/Hz ratios. The motor-generator machine disclosed therein comprises an axle; a hub rotatably mounted on said axle; an electrical induction motor comprising a rotor and a stator; and an inverter electrically connected to said stator; wherein one of said rotor or stator is attached to said hub and the other of said rotor or stator is attached to said axle. Such a machine may be located inside a vehicle drive wheel, and allows a drive motor to provide the necessary torque with reasonable system mass.

WO2006/113121 discloses a motor-generator machine comprising an induction and switched reluctance motor designed to operate as a reluctance machine at low speeds and an inductance machine at high speeds. The motor drive provides more than three different phases and is capable of synthesizing different harmonics. As an example, the motor may be wound with seven different phases, and the drive may be capable of supplying fundamental, third and fifth harmonic. The stator windings are preferably connected with a mesh connection. The system is particularly suitable for a high phase order induction machine drive systems of the type disclosed in U.S. Pat. Nos. 6,657,334 and 6,831,430. The rotor, in combination with the stator, is designed with a particular structure that reacts to a magnetic field configuration generated by one drive waveform harmonic. The reaction to this harmonic by the rotor structure produces a reluctance torque that rotates the rotor. For a different harmonic drive waveform, a different magnetic field configuration is produced, for which the rotor structure defines that substantially negligible reluctance torque is produced. However, this magnetic field configuration induces substantial rotor currents in the rotor windings, and the currents produce induction based torque to rotate the rotor.

Apparatus which enables a person to use a part or the whole of his body to control video games are known in the art.

U.S. Pat. No. 4,925,189 to Braeunig discloses a body-mounted video gaming exercise device which attaches to a user's upper body via straps and buckles. The user tilts the body to simulate movement of joystick and operate the game.

NZ537761 to James-Herbert discloses an improved computer game controller comprising a chair in a harness, in which a computer game player sits to control an avatar or the like in a computer game. By moving the chair, a joystick attached to the chair is moved, and thus the avatar is controlled by the game player's bodily movements.

U.S. Pat. No. 5,139,261 to Renato discloses a foot actuated computer game controller serving as a joystick. Pressure sensor units placed on floor are actuated by stepping on with a foot to control the game.

U.S. Pat. Nos. 7,226,018 and 7,237,748 disclose aircraft landing gear comprised of a wheel hub motor/generator disks stack, including alternating rotor and stator disks mounted with respect to the wheel support and wheel. The invention can provide motive force to the wheel when electrical power is applied, e.g. prior to touch-down. After touchdown the wheel hub motor/generator may be used as a generator thus applying a regenerative braking force and/or a motorized braking action to the wheel. The energy generated upon landing may be dissipated through a resistor and/or stored for later use in providing a source for motive power to the aircraft wheels for taxiing and ground maneuvers of the aircraft.

U.S. Patent Appl. Pub. No. 2006/0065779 discloses a powered nose aircraft wheel system for an aircraft which includes landing gear that extends from the aircraft. A wheel axel is coupled to the landing gear. A wheel is coupled to the wheel axel. A wheel motor is coupled to the wheel axel and the wheel. A controller is coupled to the wheel motor and rotates the wheel. A method of taxiing an aircraft includes permitting the wheel of the aircraft to freely spin during the landing of the aircraft. Power is transferred from an auxiliary power unit of the aircraft to the wheel motor. The wheel is rotated via the wheel motor. The aircraft is steered and the speed of the wheel is controlled via one or more controllers selected from an onboard controller and an offboard controller.

DISCLOSURE OF INVENTION

From the forgoing, it can be seen that a need has arisen for an efficient method of maneuvering and reversing aircraft on the ground without the need for extra equipment to be built into the aircraft.

It would further be advantageous to have a means for controlling the movements of an aircraft on the ground. It would be further advantageous for this means to be remote from said aircraft and to be operable by airport ground staff.

It is an object of the present invention to provide means for controlling at least one of the speed and direction of an aircraft, propelled by a self-propelled nosewheel, on the ground.

It is a further object of the invention to provide said means remotely from said aircraft, which means can be operated by airport ground staff.

It is a further object of the invention to provide said means which are intuitive, safe, and easy to operate.

It is a further object of the present invention to provide a method and apparatus for reversing an aircraft on the ground in order to decrease turnaround times and increase efficiency at airports.

An apparatus for controlling the movement of an aircraft having a self-propelled nosewheel, on the ground, is disclosed. The apparatus comprises a control arm; a control unit;

means for transmitting information to said self-propelled nosewheel; means for receiving information at said self-propelled nosewheel; and means for controlling at least one of the speed and direction of said nosewheel; whereby airport ground staff can intuitively control the movements of said aircraft by holding said arm and moving it in the direction of required movement of said aircraft.

The invention disclosed herein also comprises a method of reversing an aircraft on the ground comprising driving the aircraft using at least one self-propelled undercarriage wheel, said undercarriage wheel comprising an axle member, a wheel member, a drive member having a fixed element connected to said axle member and at least one driven element attached to said wheel member, for rotating said wheel member, and a tire affixed to said wheel member.

BRIEF DESCRIPTION OF DRAWINGS

For a more Complete explanation of the present invention and the technical advantages thereof, reference is now made to the following description and the accompanying drawings, in which.

BEST MODE FOR CARRYING OUT THE INVENTION

In a first embodiment of the invention, a method of reversing an aircraft on the ground comprises driving the aircraft using at least one self-propelled undercarriage wheel, said undercarriage wheel comprising an axle member, a wheel member, a drive member having a fixed element connected to said axle member and at least one driven element attached to said wheel member, for rotating said wheel member, and a tire affixed to said wheel member.

Figure 1A:
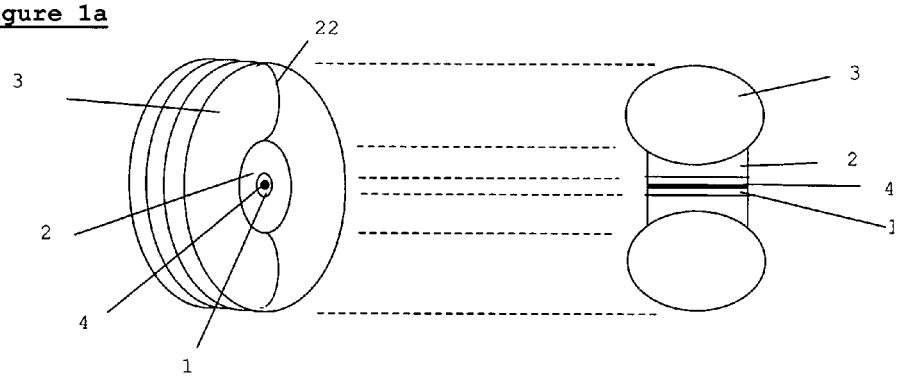
FIG. 1a shows the location of fixed and driven members in the self-propelled undercarriage wheel.

It will be readily appreciated that there are many possible configurations of an undercarriage wheel of the present invention. By way of example only, FIG. 1a shows in schematic form an undercarriage wheel having a fixed member 1 mounted on axle 4. Driven member 2 is rotatably mounted on fixed member 1. Tire 3 is externally connected to driven member 2. Tire 3 has bulge 22.

Preferably, said drive member is a high phase order electric induction motor. Said drive member may also be any other type of induction motor or other motor. Examples of suitable motors are given in the background section of this document, but these should not be taken to be limiting.

Said drive member may be reversed by any means known in the art. Specifically, in the case of an electric induction motor, said drive member may be reversed by reversing the direction of the rotating magnetic field. In the case of a three phase motor, this may be achieved by swapping any pair of connections to the power source, thereby altering the relative phase angles of the supply phases.

In the case of inverter fed induction motors, the direction of the rotating magnetic field may be reversed without physically changing electrical connections, but by electronically changing the phase angle associated with the inverter output terminals to reverse the relative phase angles of the phases. This can be achieved using a phase offset lookup table comprising a set of values stored for the normal forward operation of a particular motor, and multiplying those values by a selected factor which has the effect of generating the correct reversing phase angles. Changing the direction of a motor may require that the motor be brought to a low speed, its output ramped down, its direction reversed and its output being ramped back up.

The direction of the motor may also be reversed by using a rolling phase accumulator running in reverse in conjunction with a waveform lookup table. A common method for producing output sine waves for driving an induction motor is to use a regular rolling phase accumulator and a waveform lookup table. The phase accumulator is incremented at a rate set by the desired output frequency, and rolls back to zero upon exceeding 359 degrees. Thus for a three phase motor having phases A, B, and C, with phase A having offset 0 degrees, phase B having offset 120 degrees and phase C having offset 240 degrees, the waveform lookup table will read, at time t=0, the sine value of 0 for phase A, that of 0+120 for phase B and that of 0+240 for phase C. For t=1 the values will be sin(1), sin(1+120), sin(1+240) respectively. For t=120, the phase C value will be sin(120+240)=sin(360). Since this exceeds 359 the table rolls over and the value for sin(0) is read. Similarly for t=121, the value is sin(1) and so on. For a motor having more than three phases, i.e. a high phase order motor, the phase offsets would be different and more values would be read at each point in time, but the principle is the same.

This method produces a regular, forward moving output sine wave. To reverse the motor, a novel method is to do the following. Instead of incrementing the phase accumulator with time, it is decremented. Thus at time t=0, the values are read at positions 0, 120, and 240. At t=1 the values read are at positions 360, 119, and 239, and so on. Since the current values assigned to each slot on the rotor are now following a reverse sequence, the magnetic field is rotating in the reverse direction. This method is preferably applied to a high phase order motor but has been described by way of a three phase motor for simplicity and ease of understanding. This method may also be used on a three phase motor.

Said aircraft may be driven by direction and speed controlling means, which enable the aircraft to be driven in reverse when desired, as well as forwards, left and right, and at the required speed. Said means may be within said aircraft, for example in the cockpit, or external to said aircraft, for example at a remote aircraft control station at a gate. Internal and external control means may both be provided. Said aircraft may thus be driven in reverse, and in any direction, by the pilot or other person inside said aircraft. Alternatively, said aircraft may be driven by airport ground staff on the tarmac close to said aircraft, by air traffic control staff viewing said aircraft through a viewing panel such as a window, or virtually on a screen, or by any other member of airport staff.

Said internal speed/direction control means may comprise one or more of a joystick, yoke, sidestick, mouse, scroll ball, button, switch, keyboard, or any other control means, and is preferably located at a convenient position within the cockpit but may be located anywhere in the aircraft. Said control means may perform a different function in flight.

Said external speed/direction control means may comprise, in a first example of an external speed/direction control means, a control arm; a control unit; means for transmitting information to said self-propelled nosewheel; means for receiving information at said self-propelled nosewheel; and means for controlling at least one of the speed and direction of said nosewheel; whereby airport ground staff can intuitively control the movements of said aircraft by holding said arm and moving it in the direction of required movement of said aircraft.

Figure 1B:
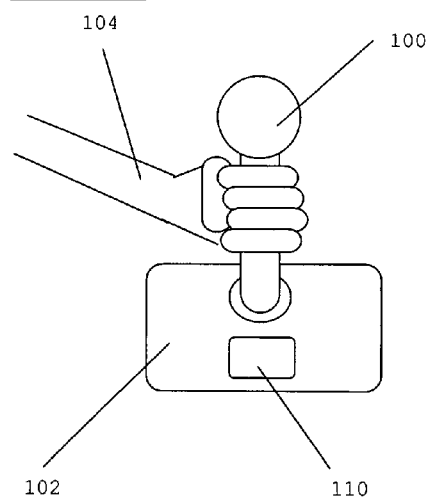
FIGS. 1b-c show a first example of the invention, in which an aircraft is controlled by a remote, short arm.
Figure 1C:
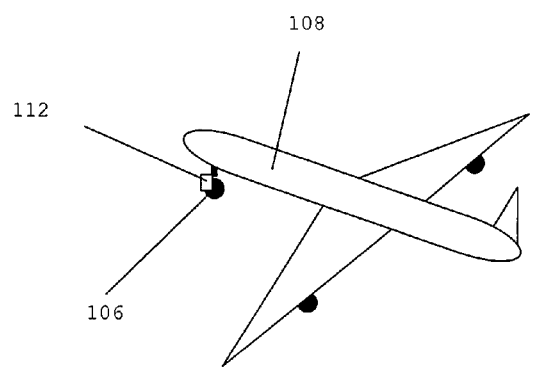

FIGS. 1b-c show a first example of the external speed/direction control means in which the control arm, control unit and means for transmitting information are remote from said aircraft and said control arm is short. Short is defined herein as shorter than a length at which a member of ground staff can walk comfortably at least one step in any direction while holding said control arm. Control arm 100 is moveably attached at its base to control unit 102, such that it can be moved by ground staff member 104. Movements of arm 100 are transmitted via transmitter 110 to receiver 112 in the self-propelled nosewheel 106 of aircraft 108, which moves according to the movements of control arm 100.

Said arm is preferably less than 0.5 m long. An advantage of this is that it can easily be manipulated while a controller stands in one location. More preferably, said arm is 0.1-0.2 m long. An advantage of this is that it can be manipulated while the heel of the operator's hand remains in one location. The arm may also be a few millimeters long and may be operated using a thumb, or may be any known form of arm or joystick suitable for this purpose.

In a first variation of the first example, said arm is rigid and can be pushed to cause the aircraft to decelerate and pulled to cause the aircraft to accelerate. The aircraft will move in a direction determined by the direction in which the arm is moved by the ground staff member holding the arm, at a speed determined by the ground staff member pushing or pulling the arm.

In a second variation of the first example, said arm is a flexible strap, rope, chain or any other flexible control arm made from any strong, flexible material or a rigid material in a flexible form such as a metal chain. In this variation, speed and direction are determined by the speed and direction respectively in which the airport ground staff member moves said arm. Alternatively, there may be a separate control for speed. The arm may only move the aircraft when it is held taut, and a safety feature may cut off communications between the arm and the aircraft when said arm becomes not taut. Alternatively, position sensors at the end of said arm may determine the movements of said arm to control the aircraft, whether said arm is taut or loose. This is discussed further in the fourth example of the external speed/direction control means.

Said arm is preferably made from weather resistant materials appropriate for use outdoors in various weather conditions.

Said arm protrudes from said control unit and is movably attached to said control unit in a manner similar to a the stick of a joystick from its base, such that said control unit can interpret movements of said arm in order to transmit them to said aircraft nosewheel. Preferably, said control unit can recognize directional movements of said arm in at least two dimensions. An advantage of this is that the movement of the aircraft can be controlled very intuitively by a ground staff member moving the arm in the direction the aircraft is desired to be moved. Alternatively, said control unit can recognize directional movements of said arm in only one dimension. Advantages of this are that the apparatus is less expensive and easier to produce and that there is less information to transmit to said nosewheel. In this variation, left and right movements could be controlled via said arm, while forward/reverse motion of the aircraft is controlled by a separate control or by a distinct movement of said arm, for example pushing or pulling said arm.

Said control unit is preferably attached to the ground or mounted on equipment attached to the ground, near a gate at an airport. An advantage of this is that it will always be at a known location. Said control unit may also be attached to any airport gate equipment such as a passenger loading bridge or other portable gate equipment. An advantage of this is that said control unit can be moved to a gate at which it is required. Said control unit may also be attached to a maintenance hanger or other location where aircraft need to be moved, or attached to any equipment in such areas.

Said control unit may comprise a security cover for preventing unauthorized use, which covers said arm or restricts movement of said arm, whereby said arm cannot be accessed or moved without a physical key, electronic key, number code, letter code, fingerprint recognition, iris recognition, barcode recognition, or any other known means for unlocking a cover. Said arm may be retractable into said unit and said unit cover may cover only the end of the retracted arm. An advantage of this is that said arm and the junction of said arm with said unit will remain clean even in the outdoor environment in which it is used. A further advantage is that less space will be occupied by said arm when not in use. A yet further advantage is that the cover will be smaller, lighter, and easier to produce, install and use. Alternatively, said cover may cover the entirety of said arm in an unretracted state. An advantage of this is that no time is taken up in pulling out the arm from its retracted state. A further advantage is that the arm can be rigid and used in the rigid mode of use described above. As a further alternative, said cover may cover and/or restrict the movement of the junction of said arm with said control unit. An advantage of this is that the cover is smaller, lighter, and easier to produce, install and use, while maintaining all the advantages of a rigid arm, and protecting the most vulnerable part of the arm, the junction. As a yet further alternative, said cover may cover and/or restrict the movement of any part of said arm.

Said control unit may comprise a transmittal-restricting safety feature whereby movements of said arm are not transmitted to said nosewheel unless said transmittal-restricting safety feature has been disabled. Said feature may be disabled using a physical key, electronic key, number code, letter code, fingerprint recognition, iris recognition, barcode recognition or any other known means of safety feature disabling.

Said control unit may include a further drop-resisting safety feature whereby if sudden or radical movements of the arm are made, such movements are not transmitted to said aircraft. Said control unit may further include a smoothing feature whereby the movements of said arm, or the signals representing said movements, are smoothed before transmittal to said aircraft.

Directional and speed information is thus inputted by the airport ground staff member through the arm, via the control unit, to a means for transmitting information to the self-propelled nosewheel. Said means for transmitting may be any known form of transmitter, transponder, transceiver or other information communicating means. Preferably said information is transmitted wirelessly for example via infrared, optical, laser, Bluetooth, radio, radar or any other known wireless information transmittal means. An advantage of this is that no wire has to be attached, detached or stored. Alternatively said information is transmitted using electric cables, optical cables, or any other known form of wire. A wire may be detachable at one or both ends, that is, the nosewheel end and the control unit end. An advantage of this is that a reliable connection is always maintained.

Said means for receiving information at said nosewheel may be a direct conversion receiver or any known form of receiver, transponder, transceiver or other known form of information receiving means.

Said means for controlling at least one of speed and direction of said nosewheel are preferably as follows. Said self-propelled nosewheel preferably propels itself by drive means comprising a motor or motors which are most preferably mesh connected, high phase order, electric induction motors but may also be any other induction motor, switched reluctance motor, permanent magnet motor or other drive means. Specifically, said motors may be any of those described in the Background section of this patent.

In the preferable arrangement where the nosewheel self-propelling drive means is an electric motor, the braking means used to control the speed of the motors is electrical braking. This may involve changing the magnetic field applied to the motors, for example by changing the voltage, current, frequency or other parameter of the current supplied by the inverter to the motor. Furthermore, the braking means may be the application of a stationary magnetic field to the motors or the driving of said motors in a direction opposite to the direction of travel.

Aircraft are commonly fitted with two nosewheels side by side on the same axis. Preferably, each nosewheel has a motor. The steering means is preferably differential torque or thrust, wherein both motors are continually driven forwards, but to cause a left turn, the right motor is driven faster than the left, and to cause a right turn the left motor is driven faster than the right. An advantage of this is that there is less heating caused by differential torque steering than by differential braking steering. Alternatively, the steering means may be the use of differential electrical braking, thus applying the left-turn maneuver of the control arm will cause the control unit to send signals via the transmitting and receiving means to the motor of the left nosewheel to brake but not the right, effecting a left turn. The right turn maneuver will cause the control unit to send signals via the transmitting and receiving means to the right nosewheel motor to brake but not the left, effecting a right turn. Alternatively, to effect a turn, one nosewheel motor may be driven forwards and the other in reverse. For example, turning the left wheel forwards and the right wheel backwards would effect a left turn. An advantage of this is that the aircraft has a smaller turning circle. Preferably, whether differential braking or differential torque is used, the control unit can detect the pressure applied to the control arm and send signals to change the speeds of the motors proportionately to the pressure applied to the control arm, thus a light pressure will effect a wide turn and a heavy pressure will effect a sharp turn. Alternatively, the control unit may not be sensitive to pressure. The forwards maneuver of the control arm may cause acceleration of both motors together to increase the speed of the aircraft. The reverse maneuver may be used to decrease the speed of the aircraft by decreasing the speed of both motors. On occasion, both left and right motors may be driven repeatedly in forwards then in reverse, then in forwards, then in reverse, etc. This would be useful, for example, to maintain a constant speed when taxiing downhill. Alternatively, or in the case where the control arm has only one dimension of movement, a separate control may be used to determine aircraft speed as described above.

In the case where the aircraft nosewheels are equipped with mechanical brakes, said means for receiving information may send signals to these mechanical brakes, which may be disc brakes, drum brakes, electromagnetic brakes, electromechanical brakes, anti-lock brakes, or any type of brake or wheel retarding means, to effect deceleration and/or differential steering.

Alternatively, and particularly but not only in the case where only one nosewheel is present, the steering means may be the aircraft's built in steering means which may be hydraulic, electrical, or any other means. The steering means may also be the mechanical turning of the strut on which the axis of the nosewheel is mounted, or the axis on which the nosewheel is mounted. Alternatively, any known means for turning a wheel or altering the speed of a wheel may be used.

Furthermore, in the case where only one nosewheel is present, there may be no built-in steering means and the nosewheel may be mounted on castors and turned manually as required. (Note: In this case, a specific variation of the invention is possible which is described here. Said nosewheel may be steered using a rigid handle physically attached to said nosewheel. Said control arm may be attached to said handle and a ground staff member may pull or (if the arm is rigid) push said handle to steer said nosewheel. In this case, only speed information will be transmitted and received in the means for transmitting and receiving information, since the steering information is being inputted directly to the nosewheel via the rigid handle. Said ground staff member may walk in front of said aircraft as in all the examples described herein, or (if said arm is rigid) said ground staff member may walk behind said nosewheel, either under the fuselage if there is space, or to the side of it, looking forwards and directing the aircraft from that vantage point, steering manually via the rigid handle and pushing/pulling on the rigid arm to control speed.)

The nosewheel motors may alternatively respond to signals from the means for receiving information by altering their torque, thus the aircraft is steered by application of differential torque to the nosewheel motors. The motors may alternatively respond to signals from the means for receiving information by effecting a change in motor speed and/or direction using any motor speed control techniques known in the art, including but not limited to varying voltage, vector field control, slip, current, resistance, and frequency. Furthermore, the motors may be connected such that they respond to signals from the means for receiving information to effect a turn and/or a change in speed using the aircraft's built-in nosewheel steering mechanism. These may be hydraulic, electrical, or any other built-in steering mechanism. Furthermore, the motors may be connected such that they respond to signals from the means for receiving information to effect a turn and/or a change in speed by any other workable means.

An advantage of the use of electrical braking to steer the aircraft is that mechanical brakes such as hydraulic or disc brakes are not used and heat loss due to friction as well as wear to the wheel are avoided.

The external speed/direction control means may further comprise an emergency stop feature wherein emergency stopping means are located on the control means. Said emergency stopping means is preferably a large, red, mushroom-shaped button as is commonly used for this purpose but may also be any other form of button, switch, lever, or any other known means for sending an immediate signal. Upon operating the emergency stopping means, a signal is sent via said transmitting means to said receiving means to stop the drive means and/or apply brakes. Said emergency stopping means overrides all other signals.

The aircraft may have batteries and said batteries may also be used to move said aircraft over short distances, for example within a hangar. The control unit may therefore further comprise battery controlling means which is preferably a switch but may be any other form of control means such as push button, slider, optical sensor, touchpad, heat sensor, etc, for turning on and off said battery. In normal operation, an aircraft being powered by an APU may take power from the batteries when needed, such as in the case of power surges while taxiing, and the battery controlling means does not preclude this possibility. Rather, it is a means for choosing only to take power from the battery for a given operation. An advantage of this is that the APU does not need to be turned on.

The control unit may further comprise similar user input means for controlling any or all of the APU, parking brakes, voice communication, emergency stopping, transfer of control to another party, or any other aspect of aircraft control.

Figure 2:
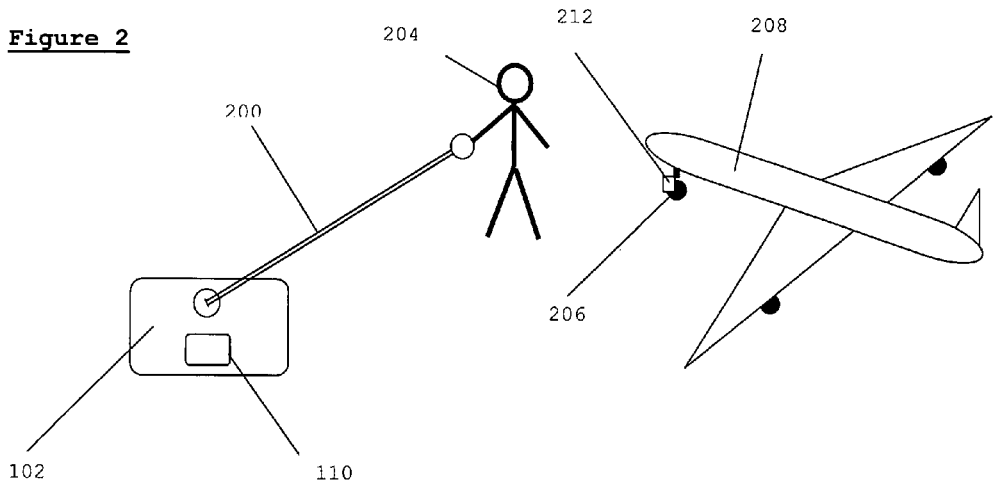
FIG. 2 shows a second example of the external speed/direction control means of the invention, in which an aircraft is controlled by a remote, long arm.

In a second example of the external speed/direction control means, shown in FIG. 2, the control arm, control unit and means for transmitting information are remote from said aircraft and said control arm is long. Long is defined herein as of sufficient length that a member of ground staff can walk comfortably at least one step in any direction while holding said control arm.

FIG. 2 shows the second example of the external speed/direction control means. Long control arm 200 is moveably attached at its base to control unit 202, such that it can be moved by ground staff member 204 who walks while holding said arm. Movements of long control arm 200 are transmitted via transmitter 210 to receiver 212 in the self-propelled nosewheel 206 of aircraft 208, which moves according to the movements of control arm 200.

Said arm is preferably greater than 0.5 m in length. An advantage of this is that a ground staff member can walk comfortably at least one step in any direction while holding said control arm. This is a sensitive and intuitive way to control the aircraft. Most preferably, said arm is between 0.5 m and 2.0 m in length as this gives a reasonable distance, covered by several steps in any direction, over which the ground staff member can walk quickly and easily. A further advantage of this is that increased sensitivity is achieved: the ground staff member has a larger space in which to walk to guide the aircraft, and therefore can more sensitively guide said aircraft. A yet further advantage is that the aircraft can be led over a greater distance, which may be necessary to bring the aircraft to a desired location. An arm longer than this becomes difficult to manipulate since the ground staff member has to walk over very large distances in order to move the aircraft. However, the invention also covers lengths longer than 2.0 m. (The term walking is used to describe a normal mode of travel of an airport ground staff member and includes running, travelling in a wheelchair, walking with crutches, travelling in a vehicle or any other mode of human travel.)

Said arm may be held at or near its far end from the control unit by a member of airport ground staff. The term 'holding' also includes the possibility of said arm being attached via a harness, strap, band, or any other means of attachment to the member of airport ground staff. An advantage of physically attaching the arm to a ground staff member is that the ground staff member's hands are free and a further advantage is that safety is increased as the arm cannot be dropped which may cause unpredictable aircraft movement.

Said arm may be rigid or flexible as in the first example of the external speed/direction control means, and all other features of said arm are as in the first example.

The control unit, the means for transmitting information, the means for receiving information, and the means for controlling at least one of the speed and direction of said aircraft are as that of the first example.

Figure 3:
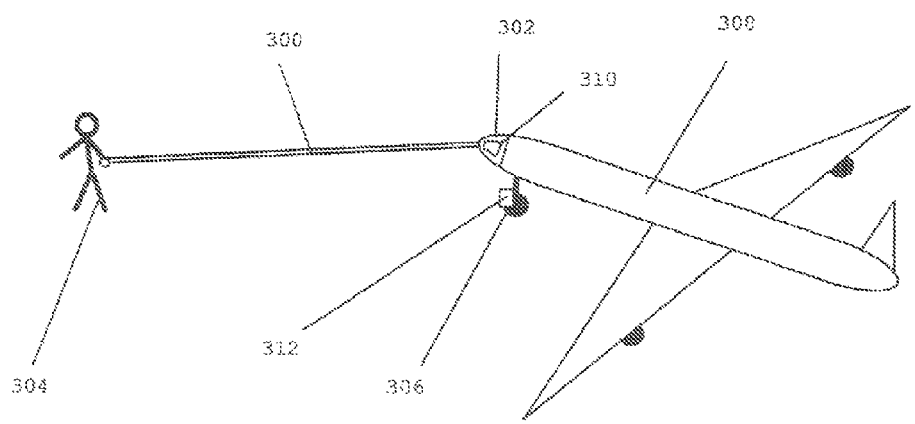
FIG. 3 shows a third example of the external speed/direction control means of the invention, in which an aircraft is controlled by an attached, long arm.

In a third example of the external speed/direction control means shown in FIG. 3, the control arm, control unit and means for transmitting information are attached to said aircraft and said control arm is long.

FIG. 3 shows the third example of the external speed/direction control means. Long control arm 300 is moveably attached at its base to control unit 302, such that it can be moved by ground staff member 304 who walks while holding said arm. Movements of long control arm 300 are transmitted via transmitter 310 to receiver 312 in the self-propelled nosewheel 306 of aircraft 308, which moves according to the movements of control arm 300.

Said arm, control unit and means for transmitting information (hereafter called the 'aircraft-moving apparatus') are preferably attached to a point at the front of the aircraft from which they can be easily reached by said ground staff member, such as the lower part of the fuselage at the front of the aircraft, or a part of the nosewheel strut or other undercarriage apparatus. An advantage of this is that the aircraft can be led from the front using said arm, and the ground staff member can feel as if s/he is pulling the aircraft along as if on a leash. This is a highly intuitive means of directing an aircraft. Said ground staff member may turn to face said aircraft and walk backwards, keeping the moving aircraft in view for increased safety. Said ground staff member may also turn to face the gate or other space in which said aircraft is to be parked as and when necessary. An advantage of this example is that the ground staff member cannot become confused as to the orientation of the aircraft-moving apparatus as s/he turns around, since the apparatus is attached to said aircraft. Alternatively, said aircraft-moving apparatus is attached to any point on the aircraft, such as the rear, the side, the strut of the undercarriage wheels under the wings, or any other part of said aircraft.

Said aircraft-moving apparatus may be detachable from said aircraft and may be attached to the aircraft upon its arrival at the airport, for example when the aircraft is close to a required parking space. An advantage of this is that less equipment is carried in flight, which reduces weight and fuel use, and that one set of apparatus may be used for many aircraft. Alternatively, the aircraft-moving apparatus may be fixed permanently to the aircraft, an advantage of this being that no time is taken up attaching and detaching the aircraft-moving apparatus. A further advantage is that there is no possibility of having to wait for aircraft-moving apparatus to arrive at the required gate or parking space. In certain airports or at particular gates, it may be easier to control an aircraft from behind, depending on the shape of the gate or maintenance hangar. Therefore, the aircraft-moving apparatus may be able to attach to more than one location on the aircraft, for example, it may be attachable to any undercarriage wheel strut, or to the nose of the fuselage and the tail of the fuselage. An advantage of this is that the aircraft-moving apparatus can be attached to the most appropriate location depending on the dimensions of the parking space.

In an alternative arrangement, more than one set of aircraft-moving apparatus may be attached at once, and more than one ground staff member may each operate a different control arm, with the resulting movement of said aircraft being a vector sum of the movements of each control arm. An advantage of this is that ground staff members can be positioned in more than one location and can therefore see the proximity of the aircraft to obstacles from more than one vantage point. Alternatively, control may be passed from one control arm to another at appropriate points as the aircraft is maneuvered. An advantage of this over the previous method is that only one ground staff member is moving the aircraft at any one time and the movements of the aircraft will therefore be easier to predict and visualize. Switching means such as buttons or switches may be in place on the control unit or units to transfer control from one unit to another. There may be one master unit which 'delivers' control to the appropriate unit, or any unit may be able to take and give control.

Said arm is preferably greater than 5 m in length. An advantage of this is that, if said aircraft-moving apparatus is attached to a nosewheel strut, a ground staff member can walk holding the end of said arm and maintain a position in front of the nose of said aircraft, thus it will be easier for him to judge the position of the front of the aircraft. Most preferably, said arm is between 10 m and 15 m in length. An advantage of this is that the further the ground staff member is from said aircraft, the safer s/he is. A further advantage of this is that the ground staff member has a larger space in which to walk to guide the aircraft, and therefore can more sensitively guide said aircraft. An arm longer than this will cause difficulty with parking an aircraft less than the arm's length from an obstacle such as a gate in front of the aircraft. However, the invention also covers lengths longer than 10 m. (It should be noted that, with a flexible arm, there is no such difficulty as the arm can be held at a point closer to the aircraft as the aircraft approaches a distance less than the arm's length from an obstacle. The redundant part of the flexible strap can be rolled up or folded, effectively making the arm shorter. However, airport safety standards will restrict the proximity of a ground staff member to an aircraft.)

Said arm may be held at or near its far end from the control unit by a member of airport ground staff. Alternatively, said arm may be attached via a harness, strap, band, or any other attachment to the member of airport ground staff. An advantage of physically attaching the arm to a ground staff member is that the ground staff member's hands are free and a further advantage is that safety is increased as the arm cannot be dropped which may cause unpredictable aircraft movement.

Said arm may be rigid or flexible as in the first example, and all other features of said arm are as in the first example.

The control unit and the means for transmitting information (with the exception of their location), the means for receiving information, and the means for controlling at least one of the speed and direction of said aircraft are as that of the first example.

In a fourth example of the external speed/direction control means, shown in FIG. 4, the control unit and means for transmitting information may be attached to or remote from said aircraft and said control arm is remote from all other apparatus. Although the control arm may be physically attached via a flexible wire or cable to said control unit, the defining feature of the fourth example is that movements of said control arm are not registered at the base of the control arm by the control unit, but rather by motion sensing equipment in said arm and/or in other equipment.

Figure 4A:
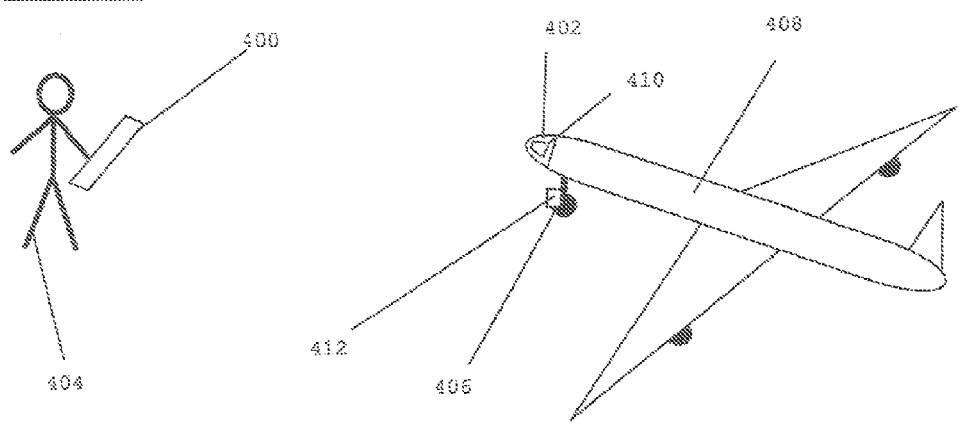
FIG. 4a shows a possible arrangement of the fourth example of the external speed/direction control means of the invention, in which an aircraft is controlled by a remote handheld device and a control unit on the aircraft.
Figure 4B:
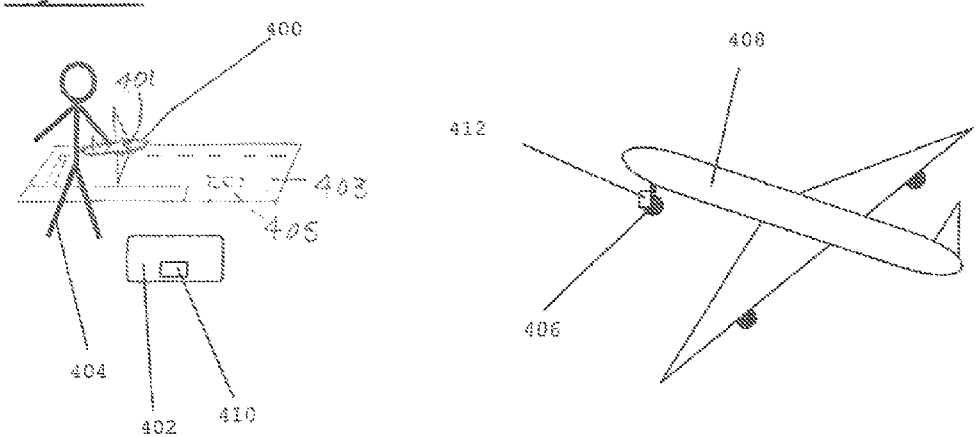
FIG. 4b shows a possible arrangement of the fourth example of the external speed/direction control means of the invention, in which an aircraft is controlled by a remote handheld device and a control unit remote from the aircraft.
Figure 4C:
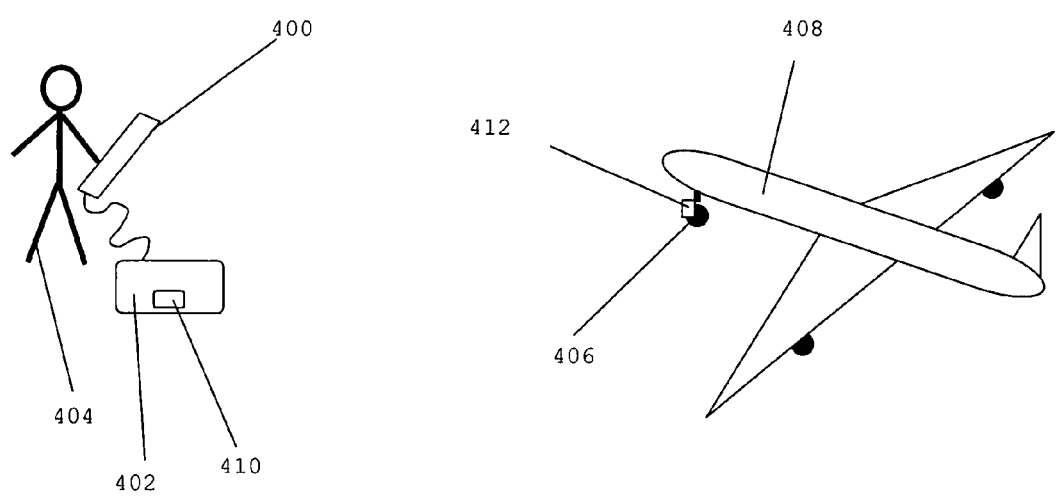
FIG. 4c shows a possible arrangement of the fourth example of the external speed/direction control means of the invention, in which an aircraft is controlled by a handheld device attached to a control unit remote from the aircraft.

FIGS. 4a-c show possible arrangements of the fourth example of the external speed/direction control means. In FIG. 4a, control arm 400 is remote from aircraft 408. Control unit 402 and means for transmitting information 410 are attached to aircraft 408. Movements of control arm 400 are transmitted via transmitter 410 to receiver 412 in the self-propelled nosewheel 406 of aircraft 408, which moves according to the movements of control arm 400.

In FIG. 4b, control arm 400 is remote from aircraft 408. Control unit 402 and means for transmitting information 410 are remote from aircraft 408. Movements of control arm 400 are transmitted via transmitter 410 to receiver 412 in the self-propelled nosewheel 406 of aircraft 408, which moves according to the movements of control arm 400.

In FIG. 4c, control arm 400 is remote from aircraft 408. Control unit 402 and means for transmitting information 410 are remote from aircraft 408 but attached via a flexible wire or cable to control arm 400. Said wire or cable may provide power. Movements of control arm 400 are transmitted via transmitter 410 to receiver 412 in the self-propelled nosewheel 406 of aircraft 408, which moves according to the movements of control arm 400.

These figures are by way of example only and are not intended to be limiting. Any configuration of the control arm of the fourth example, a control unit, transmitting means, receiving means and nosewheel controlling means as described herein constitute this invention.

Said arm of the fourth example of the external speed/direction control means is preferably a handheld device which is ergonomically fitted to the hand and is preferably lightweight. Said device preferably has a shape which enables the ground staff member to easily orient the arm with respect to the aircraft. Said device may be shaped like a miniature aircraft and the correct orientation would therefore be the same way around as said aircraft. FIG. 4b illustrates a control arm 400 with an aircraft shape and motion sensing equipment 401. An advantage of this is that control of said aircraft would therefore be highly intuitive as the ground staff member simply moves the miniature aircraft in the manner in which s/he wishes the aircraft to move. A miniature ground plan 403 in proportion to the size of said miniature aircraft may be provided to enable the ground staff member to move the aircraft according to ground markings and obstacles. Such a ground plan may itself contain motion sensing equipment 405 which determines the movements of said arm for transmission to said information receiving means. The ground plan may also be a simple drawing on paper, or may be a more resilient material and may be moveable or may be permanently fixed to apparatus at the section of ground that it represents. Said arm may also be any other shape or weight, for example an oblong, a stick, an arrow, a gun, or any other shape.

Said motion sensing equipment may be one or more of a gyroscope, an accelerometer, GPS, a sensor mounted on a control unit or any other motion detecting means. Said sensor may receive infrared and ultrasound signals from said arm and determine the position of said arm by the time delay between the two signals. Said sensor may determine the position of said arm by any other means.

Said control unit may contain motion sensing equipment as described above. Said control unit differs from that of the first example in that said arm does not protrude from said control unit and said control unit does not interpret movements of said arm physically. Said arm may comprise a space in which said arm can be placed for storage, and may comprise a security cover as described in the first example of an external speed/direction control means, for covering said arm in place on said security cover. Alternatively, a security cover may cover only said control arm, separate from said control unit. All other features of said control unit are as described in the first example of an external speed/direction control means.

The means for transmitting information, means for receiving information and means for controlling the speed and/or direction of said nosewheel are all as described in the previous examples of an external speed/direction control means.

In a fifth example of the external speed/direction control means, a method of remotely controlling the movement of an aircraft having a self-propelled nosewheel, on the ground, is disclosed. The method comprises the steps of: accessing and turning on a control unit, holding a control arm, moving the control arm in the direction in which and/or at the speed at which the aircraft is desired to be moved.

Said control unit, control arm and aircraft are as described in any of the previous examples of external speed/direction control means. This ends the discussion of the external speed/direction control means.

Said drive member may occupy the space inside said wheel. The width of said drive member may be equal to the width of the tire of said undercarriage, as shown in FIG. 5, including the bulge 22 of said tire, or a smaller width. Said tire may be a low profile tire to increase the space available inside said tire. Said drive member or part of said drive member may occupy space in a telescopic leg of said undercarriage assembly, or any other part of said undercarriage assembly.

In a second embodiment of the invention, an apparatus for reversing an aircraft on the ground is disclosed, comprising at least one self-propelled undercarriage wheel comprising an axle member, a wheel member, a drive member having a fixed element connected to said axle member and at least one driven element attached to said wheel member, for rotating said wheel member, a tire affixed to said wheel member, and means for controlling at least one of speed and at least one direction of said aircraft.

In a third embodiment of the invention, an apparatus for reversing an aircraft on the ground with increased stability is disclosed comprising a reversing self-limiting feature. Said apparatus is as described in any and all of the previous text of the description. Said self-limiting feature is the reversible drive means located in the nosewheel, used as a brake, and operates as follows. When an aircraft equipped with regular reversing and braking means, which is reversing on the ground, brakes, a rearward tipping torque is generated. The tipping risk is greatest when the braking wheels are located at the centre of the aircraft, especially when, as is usually the case, there are no tail wheels. (For this reason, pilots are trained not to brake during reversing on the ground.) Thus, locating the drive means and thus the braking means in the nosewheel increases stability to a degree. Braking may be accomplished using the drive means by driving the drive means in reverse, as described above, or by stopping the drive means, or by using mechanical brakes on the drive means. Stability is increased further, and tipping risk reduced further, due to a self-limiting feature whereby, as the aircraft begins to tip, it pivots about the main gear and the nosewheel lifts from the ground. Thus friction between the nosewheel and the ground is zero, thus any reversing force immediately becomes zero also, since this depends upon friction between the nosewheel and the ground. Since there is no longer a reversing force, there is no longer a tipping torque, thus tipping stops and the aircraft reverts to a horizontal position. The nosewheel then makes contact with the ground again and friction is produced between the nosewheel and the ground, so that reversing can continue until such time as the tipping torque causes the aircraft to tip again.

INDUSTRIAL APPLICABILITY

The forgoing provides for an efficient method of maneuvering and reversing aircraft on the ground without the need for extra equipment to be built into the aircraft, and discloses a method of reversing an aircraft on the ground.

The invention claimed is:

1. A method for controlling a direction of ground travel and speed of an aircraft equipped with a self-propelled undercarriage comprising
   a. providing an aircraft with at least one self-propelled undercarriage wheel capable of driving the aircraft on the ground;
   b. providing an undercarriage wheel drive means controllable to drive the self-propelled undercarriage wheel to move the aircraft on the ground;
   c. providing an aircraft moving apparatus comprising a structural unit comprising a control unit with integral ground speed and direction controls in direct operative communication with a corresponding receiver located on said undercarriage wheel drive means, a control arm in operative communication with said control unit having an operating length selected to correspond to a selected location of the aircraft moving apparatus exterior to said aircraft, and a transmitter adapted to transmit information from said speed and direction controls to said corresponding receiver, said control unit being activatable by an operator in operative contact with said structural unit to drive the aircraft in a forward or a reverse direction;
   d. positioning said aircraft moving apparatus at said selected location so that said speed and direction controls are in direct operative communication with said corresponding receiver;
   e. activating the ground speed and direction controls from the selected location by moving the control arm, thereby causing the transmitter to transmit speed and direction information to said undercarriage wheel drive means through the corresponding receiver to control operation of the undercarriage wheel drive means, thereby causing said self-propelled undercarriage wheel to drive the aircraft on the ground at a desired speed and in a desired direction determined by the operator's movement of said control arm; and
   f. locating more than one of said aircraft moving apparatus exterior to said aircraft, wherein movements of said aircraft produced by operation of all of said aircraft moving apparatus are a vector sum of the movements of all said aircraft-moving apparatus.

2. The method of claim 1, wherein said control arm is pushed by the operator to cause the aircraft to decelerate and pulled to cause the aircraft to accelerate.

3. The method of claim 1, further comprising attaching said aircraft moving apparatus to said operator using a harness, a strap, or a band.

4. The method of claim 1, wherein multiple aircraft moving apparatus are located exterior to said aircraft and only one of said aircraft moving apparatus controls the movements of said aircraft at any given time; and each said aircraft moving apparatus has switching means, adapted to pass control of aircraft movement back and forth between said sets of aircraft moving apparatus.

5. Remotely controlling the movement of an aircraft with at least one self-propelled undercarriage wheel on the ground, using the method of claim 1, further comprising:
   positioning said aircraft moving apparatus and said operator at a selected ground location exterior to and remote from said aircraft;
   accessing and turning on said control unit to activate said speed and direction controls, wherein said operator holds said movable control arm and moves said movable control arm in a direction in which or at a speed at which it is desired to move the aircraft to cause said control unit to transmits information from said speed and direction controls to said corresponding receiver to move said at least one undercarriage wheel, whereby the operator remotely controls ground speed or direction of movement of said aircraft by moving said movable control arm at a speed or in a direction of desired movement of said aircraft.

6. Remotely controlling the movement of an aircraft as described in claim 5, wherein said at least one undercarriage wheel is a pair of nose wheels, said direction of desired movement is a reverse direction, and wherein said speed and direction controls are in operative communication with braking means and steering means operatively associated with said pair of said nose wheels and said movable control arm so that the operator can control movement of the aircraft in a reverse direction.

7. The method of claim 1, wherein said undercarriage wheel drive means is a high phase order electric induction motor or a high phase order mesh-connected electric induction motor.

8. The method of claim 1, further comprising removably or fixedly attaching said aircraft moving apparatus to an exterior location on the outside of an aircraft selected from the list of locations comprising: on a front half of said aircraft; on said aircraft nose; on a lower part of a front of the fuselage of said aircraft; and on an undercarriage wheel strut.

9. The method of claim 1, further comprising the operator holding said aircraft moving apparatus at a selected ground location exterior to and remote from the aircraft; and moving said movable control arm to activate and control said speed and direction controls while the operator is walking in front of or behind said at least one self-propelled undercarriage wheel.

10. The method of claim 1, wherein said at least one self-propelled undercarriage wheel is a nose wheel or a pair of nose wheels.

11. The method of claim 10, wherein said at least one said self-propelled undercarriage wheel comprises a pair of nose wheels and each of said pair of nose wheels has a nose wheel drive means controllable to drive each nose wheel, and each said nose wheel includes braking means, further comprising moving said aircraft in a desired direction by differential braking of said nose wheels and moving said aircraft at a desired speed by moving said movable control arm to selectively control acceleration and deceleration of each said nose wheel drive means.

12. The method of claim 11, further comprising providing steering means, using said nose wheel drive means and said braking means to control the speed of said nose wheels, and using said steering means to controls the direction of said nose wheels in response to movement of said control arm.

13. The method of claim 1, further comprising moving said movable control arm by the operator to activate said speed and direction controls to communicate with said receiver to cause the at least one undercarriage wheel drive means to drive the at least one self-propelled undercarriage wheel to move the aircraft in a forward direction on the ground.

14. A method for controlling a direction of ground travel and speed of an aircraft equipped with a self-propelled undercarriage comprising a. equipping an aircraft with at least one self-propelled undercarriage wheel capable of driving the aircraft on the ground and at least one undercarriage wheel drive means controllable to drive the at least one self-propelled undercarriage wheel to move the aircraft on the ground mounted on an axle of said at least one self-propelled undercarriage wheel;

b. providing an aircraft moving apparatus at a location exterior to and remote from said at least one self-propelled undercarriage wheel comprising a control unit with integral ground speed and direction controls in remote operative communication with a corresponding receiver located on said at least one undercarriage wheel drive means, a movable control arm in operative communication with said control unit having an operating length selected to correspond to a selected location of the aircraft moving apparatus exterior to and remote from said aircraft, and a transmitter adapted to transmit information from said ground speed and direction controls to said corresponding receiver when said movable control arm is activated by an operator;

c. positioning said aircraft moving apparatus at said selected exterior location remote from said aircraft so that said speed and direction controls are in remote operative communication with said corresponding receiver;

d. moving the movable control arm to activate the ground speed and direction controls from the selected exterior location remote from the aircraft, causing the transmitter to transmit speed and direction information to said at least one undercarriage wheel drive means through the corresponding receiver to control operation of the at least one undercarriage wheel drive means, further causing the at least one undercarriage wheel drive means to drive the at least one self-propelled undercarriage wheel and to drive the aircraft on the ground at a desired speed and in a desired direction determined by the operator's movement of the movable control arm; and e. providing said movable control arm with an aircraft or arrow shape selected to enable the operator to easily orient the movable control arm with respect to the aircraft and said movable control arm includes a motion sensor, wherein the method further comprises providing a ground plan configured and sized proportionally to represent an aircraft ground environment where aircraft movement is to be controlled, and said ground plan contains motion sensing equipment to sense the motion of said movable control arm, whereby said ground plan senses the motion of said movable control arm as the operator moves the movable control arm relative to the ground plan and communicates the sensed motion of the movable control arm to said transmitter to cause the aircraft to move within the ground environment according to the operator's movements of the movable control arm relative to the ground plan.

15. A method for controlling a direction of ground travel and speed of an aircraft equipped with a self-propelled undercarriage comprising a. providing an aircraft with at least one self-propelled undercarriage wheel capable of driving the aircraft on the ground;

b. providing an undercarriage wheel drive means controllable to drive the self-propelled undercarriage wheel to move the aircraft on the ground;

c. providing an aircraft moving apparatus comprising a structural unit with integral ground speed and direction controls within said unit in operative communication directly with a corresponding receiver located on said undercarriage wheel drive means and activatable by an operator in operative contact with said structural unit to drive the aircraft in a forward or a reverse direction;

d. positioning said aircraft moving apparatus at a selected ground or other location exterior to the aircraft so that said speed and direction controls are in direct operative communication with said corresponding receiver; and
e. activating the ground speed and direction controls from the selected location to control the operation of the undercarriage wheel drive means and cause the self-propelled undercarriage wheel to move the aircraft in a forward or reverse direction on the ground at a desired speed;
wherein said aircraft is moved by said self-propelled undercarriage wheel in a reverse direction by reversing direction of rotation of said undercarriage wheel drive means by a method comprising:
wherein when said drive means is a three phase electric induction motor having a power source and connections to said power source, swapping any two connections to a power source; or
wherein when said drive means is an electric induction motor having a power source, connections to said power source, more than one phase having relative phase angles, and an inverter having output terminals, reversing relative phase angles of phases by electronically changing a phase angle associated with an inverter output terminal connected to each phase; or
wherein when said drive means is an electric induction motor, using a decrementing rolling phase accumulator in conjunction with a waveform lookup table, whereby said aircraft is moved by said self-propelled undercarriage wheel in a reverse direction.

16. The method of claim 15, wherein said self-propelled undercarriage wheel comprises a reversing self-limiting feature, further comprising the step of using the reversing self-limiting feature when reversing and braking the aircraft during ground movement.

17. A method for controlling a direction of ground travel and speed of an aircraft equipped with a self-propelled undercarriage comprising
a. equipping an aircraft with at least one self-propelled undercarriage wheel capable of driving the aircraft on the ground and at least one undercarriage wheel drive means controllable to drive the at least one self-propelled undercarriage wheel to move the aircraft on the ground mounted on an axle of said at least one self-propelled undercarriage wheel;
b. providing an aircraft moving apparatus at a location exterior to and remote from said at least one self-propelled undercarriage wheel comprising a control unit with integral ground speed and direction controls in remote operative communication with a corresponding receiver located on said at least one undercarriage wheel drive means, a movable control arm in operative communication with said control unit having an operating length selected to correspond to a selected location of the aircraft moving apparatus exterior to and remote from said aircraft, and a transmitter adapted to transmit information from said ground speed and direction controls to said corresponding receiver when said movable control arm is activated by an operator;
c. positioning said aircraft moving apparatus at said selected exterior location remote from said aircraft so that said speed and direction controls are in remote operative communication with said corresponding receiver;
d. moving the movable control arm to activate the ground speed and direction controls from the selected exterior location remote from the aircraft, causing the transmitter to transmit speed and direction information to said at least one undercarriage wheel drive means through the corresponding receiver to control operation of the at least one undercarriage wheel drive means, further causing the at least one undercarriage wheel drive means to drive the at least one self-propelled undercarriage wheel and to drive the aircraft on the ground at a desired speed and in a desired direction determined by the operator's movement of the movable control arm; and
e. when the aircraft is located at a departure location, positioning said aircraft moving apparatus at a selected ground location remote from said aircraft at said departure location, and moving said movable control arm by the operator to activate said speed and direction controls to communicate with said at least one undercarriage wheel drive means receiver to cause the at least one undercarriage wheel drive means to drive the at least one self-propelled undercarriage wheel to move the aircraft in a reverse direction on the ground to push back from the departure location; wherein said undercarriage wheel drive means comprises an electric induction motor and further comprising activating said speed and direction controls to cause the at least one undercarriage wheel drive means to be reversed by reversing a direction of a rotating magnetic field, thereby rotating said the at least one self-propelled undercarriage wheel in a reverse direction and driving the aircraft in the reverse direction.

18. The method of claim 17, wherein said at least one undercarriage wheel drive means comprises a high phase order electric induction motor fed by an inverter and further comprising activating said speed and direction controls to reverse a direction of said at least one undercarriage wheel drive means by physically changing electrical field connections or by electronically changing a phase angle associated with inverter output terminals to reverse relative phase angles of supply phases, whereby said aircraft is driven in a reverse direction.

* * * * *